United States Patent
Wang et al.

(10) Patent No.: US 7,594,013 B2
(45) Date of Patent: Sep. 22, 2009

(54) CREATING HOME PAGES BASED ON USER-SELECTED INFORMATION OF WEB PAGES

(75) Inventors: Jian Wang, Beijing (CN); Hua-Jun Zeng, Beijing (CN); Chenxi Lin, Beijing (CN); Zheng Chen, Beijing (CN); Benyu Zhang, Beijing (CN); Bing Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 477 days.

(21) Appl. No.: 11/136,029

(22) Filed: May 24, 2005

(65) Prior Publication Data

US 2006/0271834 A1 Nov. 30, 2006

(51) Int. Cl.
*G06F 15/173* (2006.01)
(52) U.S. Cl. .................. 709/224; 709/223; 709/225; 709/226
(58) Field of Classification Search .......... 709/224, 709/218, 226; 715/205, 204, 206
See application file for complete search history.

(56) References Cited

U.S. PATENT DOCUMENTS

| 7,203,909 | B1* | 4/2007 | Horvitz et al. | 715/765 |
| 2002/0063736 | A1* | 5/2002 | Sugimoto | 345/762 |
| 2002/0165955 | A1* | 11/2002 | Johnson et al. | 709/224 |
| 2005/0038867 | A1* | 2/2005 | Henderson et al. | 709/217 |
| 2005/0097095 | A1* | 5/2005 | Halt, Jr. | 707/3 |
| 2006/0248442 | A1* | 11/2006 | Rosenstein et al. | 715/501.1 |

* cited by examiner

*Primary Examiner*—Jeffrey Pwu
*Assistant Examiner*—Abdelnabi O Musa
(74) *Attorney, Agent, or Firm*—Perkins Coie LLP

(57) ABSTRACT

A method of creating a personal home page containing information of interest assembled from various web sites. The method includes the partitioning of web pages into web blocks. Users may collect various web blocks from different web pages and utilize those web blocks to define the dynamic personal homepage. In addition, the web blocks may be tracked to update content in the personal home page based on corresponding changes in the original web page.

8 Claims, 6 Drawing Sheets

CREATING HOME PAGES BASED ON USER-SELECTED INFORMATION OF WEB PAGES

FIELD OF THE INVENTION

The invention generally relates to creating a personal home page containing information of interest assembled from various web sites. In particular, information placed on a personal home page is tracked and updated with changes to the tracked information.

BACKGROUND OF THE INVENTION

Web pages on the World Wide Web are becoming more complex to accommodate rapidly growing information needs. For example, many web browsers contain a variety of information such as headline news, sports scores, market information, shopping information, and entertainment news. The information on some of these web browsers may not be modified by users. On other web browsers, a limited amount of information may be modified such as whether a user wants to view particular information such as sports news or headline news on a particular page of the web browser. Such modifiable information, however, consists of information already chosen by web browser content providers and is limited in scope and subject matter. The modifiable information may be made available to users as selectable options from a list or other selection type screen.

Home pages of web browsers are becoming overpopulated with information that individual users have no need or interest in viewing. For example, the home page of a typical news portal may contain many sections to display news on different topics and in different areas on a single page. These areas may include travel news, entertainment news, new product information, education news, business information, and health information. However, when a user is reading a web page, it does not mean that they are interested in the entire content of the whole web page. Typically, users are only interested in a particular subject of information such as entertainment news viewed on a particular web page.

Currently, users have to visit numerous different web sites in order to view the information in which they are interested in displaying. For example, a user may favor sports news from a first web site and weather information from a second web site. A user wanting to view both their favorite sports news from the first web site and weather information from the second web site has to visit each of these web sites individually. This may be very tedious and time consuming, especially when visiting large web sites having numerous web pages or when using portable small screen devices.

Thus, it would be an advancement in the art to provide a method in which users may create their own personal web page composed of information from various other web sites. Furthermore, the method should enable users to view updated information on their personal web page with a minimal amount of effort.

BRIEF SUMMARY OF THE INVENTION

The invention includes creation of a dynamic personal home page. An aspect of the invention allows web pages to be partitioned into web blocks that represent single information units. Users may collect various web blocks from different web pages and utilize those web blocks to define a dynamic personal homepage. Web blocks may be collected by dragging information from various different web pages and dropping them into a user's dynamic personal homepage. In another aspect of the invention, web blocks may be tracked. Tracking may allow mapping of a new Document Object Model (DOM) tree to an original DOM tree with minimum differences to locate the proper subtree for maximum resilience allowing for changing content in the original web pages. In addition, the tracking may be accomplished with a learning algorithm. The changed content in the original web page may be reflected in the created dynamic personal home page to enable a user to view updated information.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF THE INVENTION

Figure 1:
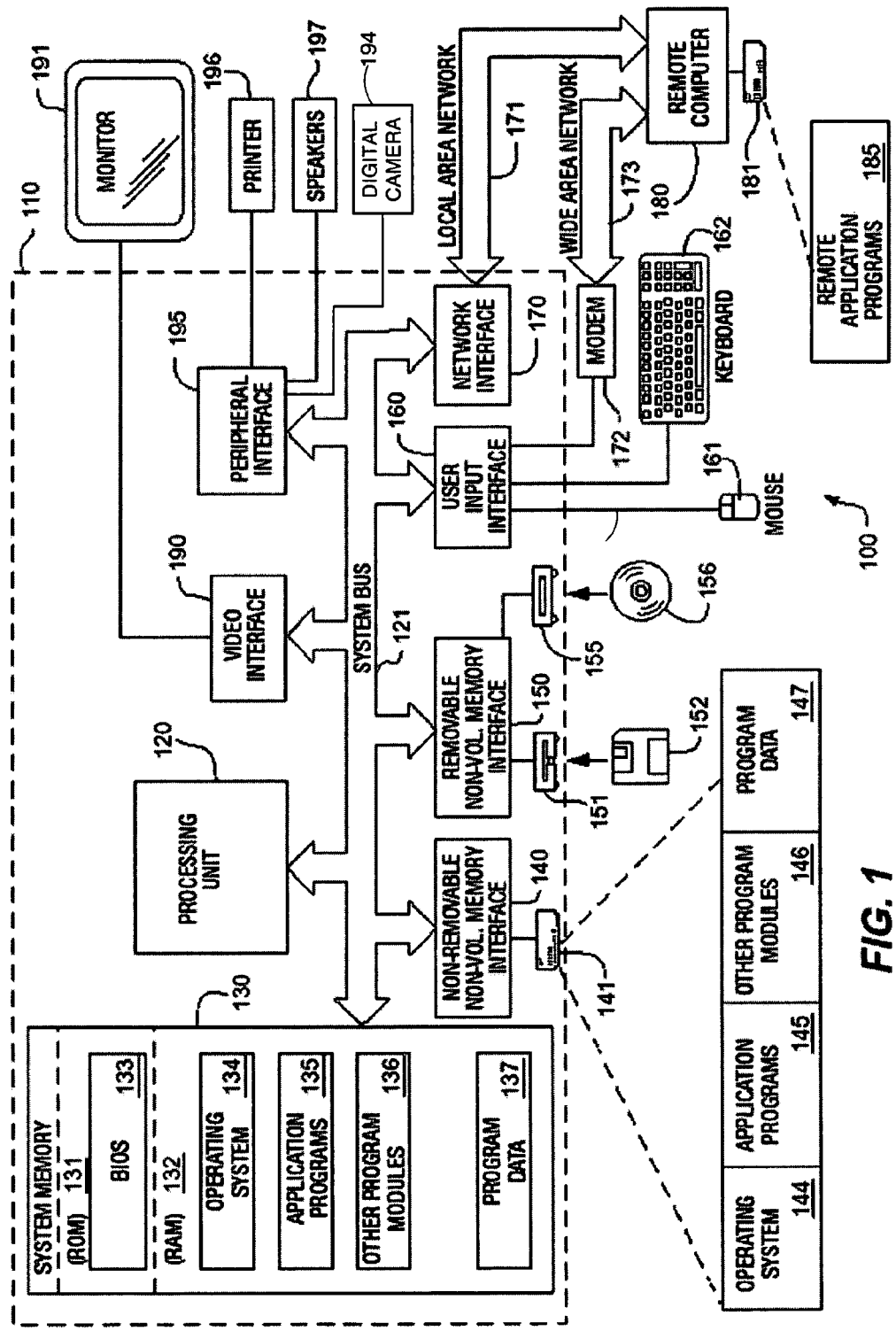
FIG. 1 illustrates an example of a suitable computing system environment on which the invention may be implemented.

FIG. 1 illustrates an example of a suitable computing system environment 100 on which the invention may be implemented. Computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and wireless pointing device 161, commonly referred to as a mouse, trackball or touch pad.

Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. A peripheral interface 195 may interface to a video input device such as a scanner (not shown) or a digital camera 194, where output peripheral interface may support a standardized interface, including a universal serial bus (USB) interface.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
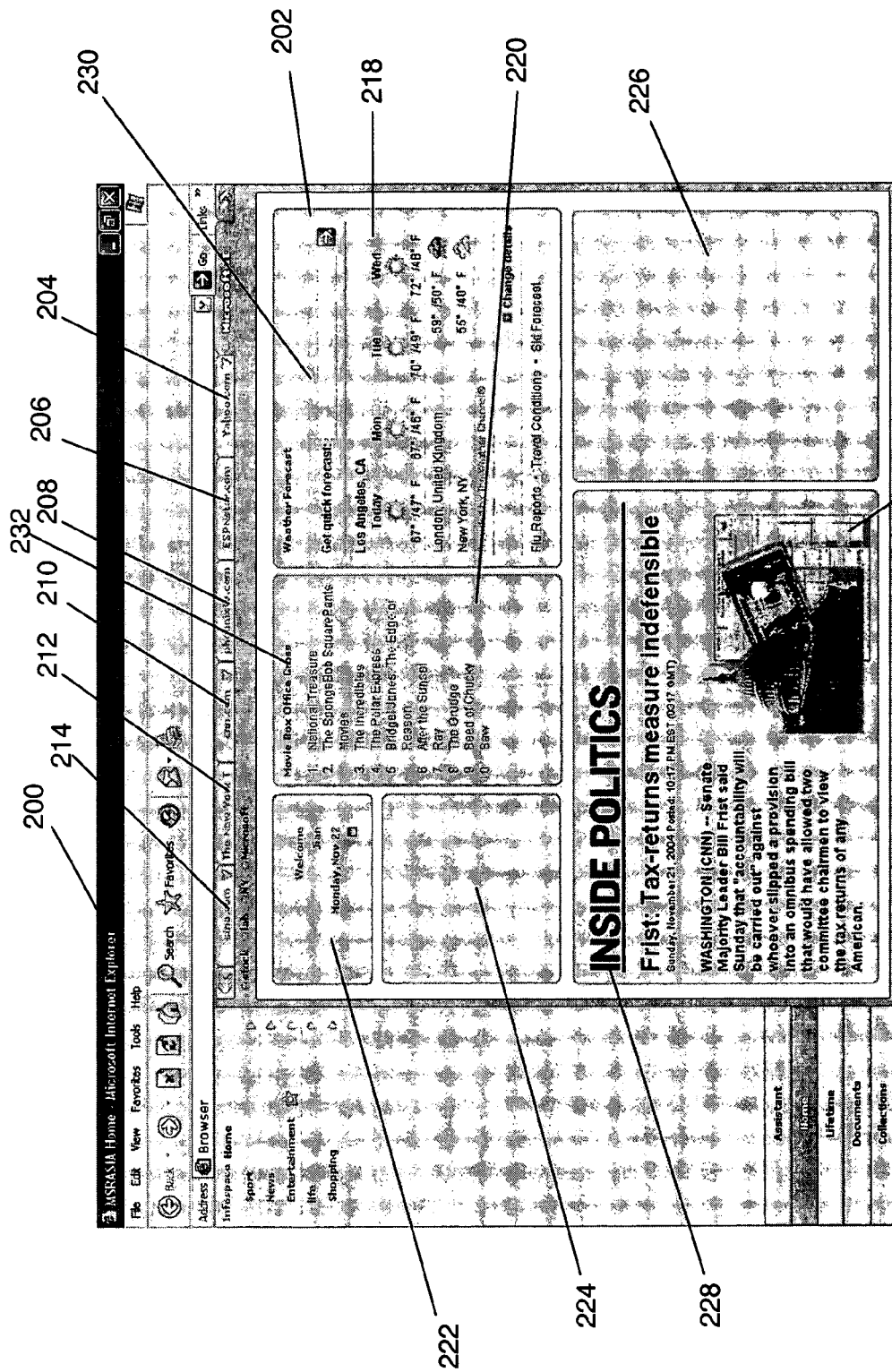
FIG. 2 illustrates partitioning of information into web blocks in accordance with an aspect of the invention.

FIG. 2 illustrates partitioning of information from a web page or web pages into web blocks in accordance with an aspect of the invention. In FIG. 2, a web browser 200 such as Microsoft Internet Explorer is utilized to display information. The web browser 200 as shown in FIG. 2 illustrates a dynamic personal home page 202. The dynamic personal home page 202 may be comprised of various information elements of other existing web pages. For instance, FIG. 2 illustrates web pages such as "Yahoo.com" 204, "ESPNstar.com" 206, "phoenixtv.com" 208, "cnn.com" 210, "The New York Times.com" 212, and "sina.com" 214. Those skilled in the art will realize that numerous other web pages may be displayed on web browser 200 and those shown in FIG. 2 are meant to be exemplary. Web pages 204-214 may contain sections of information that a user finds interesting and desirable to display and read on their personal home page. Such desirable sections or portions of individual web pages may be partitioned into individual web blocks which represent single information units. For example, dynamic personal home page 202 may include numerous display panes such as display panes 216-226. Each of the display panes 216-226 may display information of interest to the owner of dynamic personal home page 202. Those skilled in the art will realize that dynamic personal home page 202 may include fewer or additional display panes in order to view various amounts of information on a home page. A user of dynamic personal home page 202 may define the particular information that is displayed in each of the display panes 216-226. For example, a user interested in political news may be interested in viewing political news as reported by CNN on their web page 210. Such a user may decide to place this political news information on their dynamic personal home page 202 for viewing on a regular basis without having to directly access CNN's web page 210.

In an aspect of the invention, a user may define a web block to contain political news information. The web block definition may combine a DOM tree structure of a selected HTML web page and a user's selection of information to be displayed in the dynamic personal home page 202. For example, the user may define a web block such as "Inside Politics" web block 228. The "Inside Politics" web block 228 may have been a portion of a web page as displayed on CNN's web page 210. A user may have defined the "Inside Politics" web block 228 by selecting the information using a selection device such as mouse or key pad. A mouse wheel may be used to adjust the size the web block. Those skilled in the art will realize that other selection devices may be utilized to highlight the portion of material which will define a web block.

The selected information may be dragged or copied onto a user's dynamic personal home page 202 and into a particular display pane such as display pane 216. In the alternative, a display pane sized to the particular created web block may be created upon the web block being dragged or copied onto the dynamic personal home page 202.

As another example, a user interested in weather information displayed on "The New York Times" web page 212 may decide to place weather forecast information on their dynamic personal home page 202 for viewing on a regular basis without having to directly access "The New York Times" web page 212. A user may define a web block to contain the weather forecast information. A web block such as "Weather Forecast" web block 230 may be defined. The "Weather Forecast" web block 230 may have been a portion of a web page as displayed on "The New York Times" web page 212. A user may have defined the "Weather Forecast" web block 230 by selecting the information using a selection device. The selected information may be dragged or copied onto a user's dynamic personal home page 202 and into a particular display pane such as display pane 218.

In a further example, a "Movie Box Office Gross" web block 232 may be defined. The "Movie Box Office Gross" web block 232 may have been a portion of an entertainment web page (not shown). The selected entertainment information may have been dragged or copied onto a user's dynamic personal home page 202 and into a particular display pane such as display pane 220.

Figure 3:
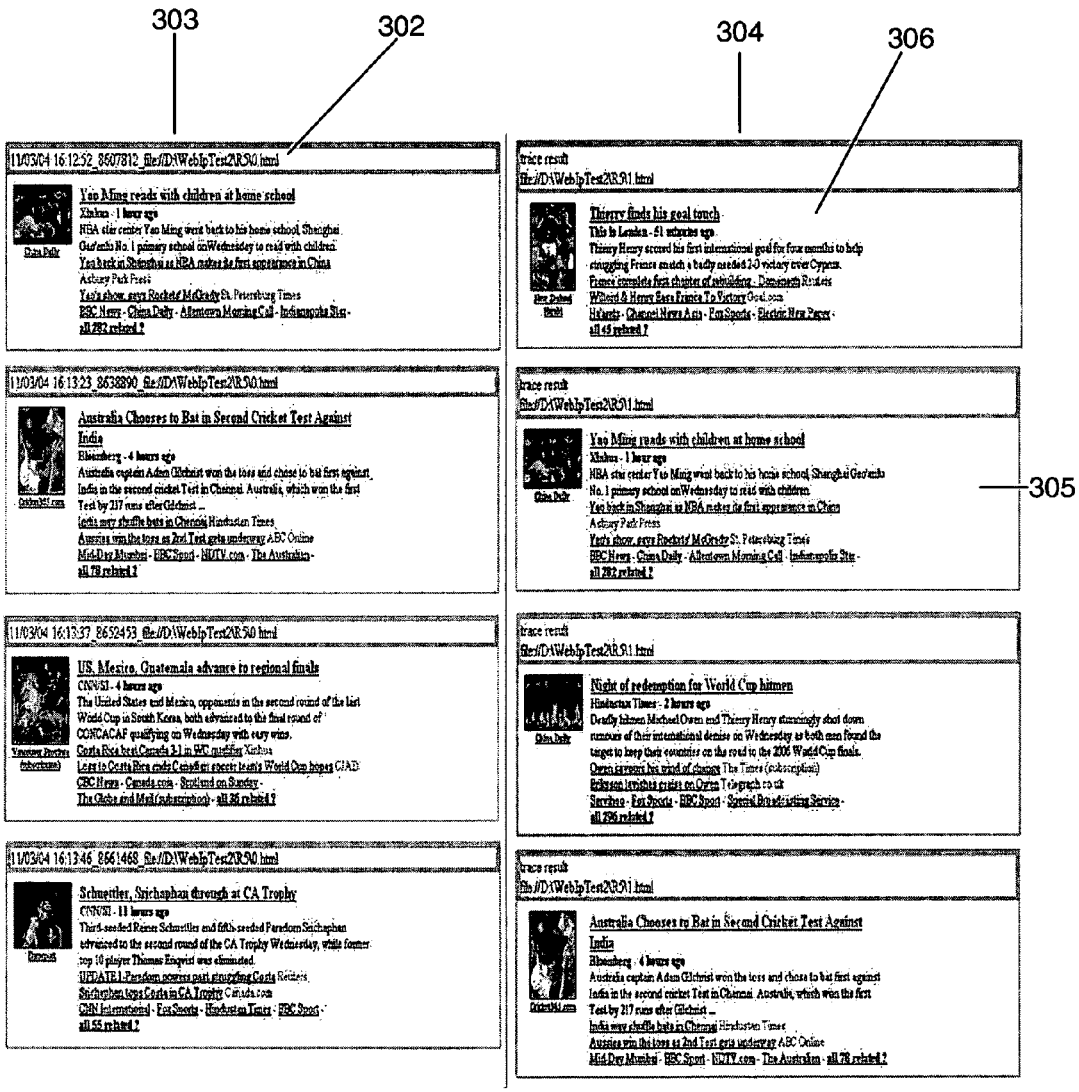
FIG. 3 illustrates tracking of web block information in accordance with an aspect of the invention.

FIG. 3 illustrates tracking of web block information in accordance with an aspect of the invention. Layouts as well as content information on web pages change frequently so tracking of information defined by web blocks may enable users to keep updated information on their dynamic personal home pages. As stated above, a web page may be parsed into a DOM tree. A defined web block may be viewed as a subtree of the parsed DOM tree. Because the web block may be viewed as a subtree, the tracing problem may be illustrated as given a DOM tree T and its subtree S, when T has evolved to a DOM tree T', which subtree S' in T' is corresponding to S.

A subtree mapping method and a learning method are disclosed in order to track web blocks. In an aspect of the invention, the subtree mapping method is utilized to track web block information. The subtree mapping method may be utilized when user feedback is not available as tree structures of web pages do not change frequently, whereas, content of web pages may change frequently. The subtree structures are relatively stable factors that may be compared without user feedback. The subtree mapping method maps the new DOM tree to the original one with minimum difference. Through mapping a user may find a subtree in the new tree which corresponds to the tracked subtree in the original tree. The difference may be accumulated by the number of un-mapped nodes in the two trees. Given two trees T and T', let r and r' are their root nodes respectively. n(T'') stands for the number of nodes in T'', where T'' can be T or T', or any subtree of them. The difference of T and T' is defined as Diff(T,T'), which is the minimum in the three conditions. The following three equations may outline the subtree mapping method. The calculated minimum difference may be utilized to track the web blocks.

1) Any node in T are not mapped to a node in T', then $$Diff(T,T')=n(T)+n(T')$$

Figure 5:
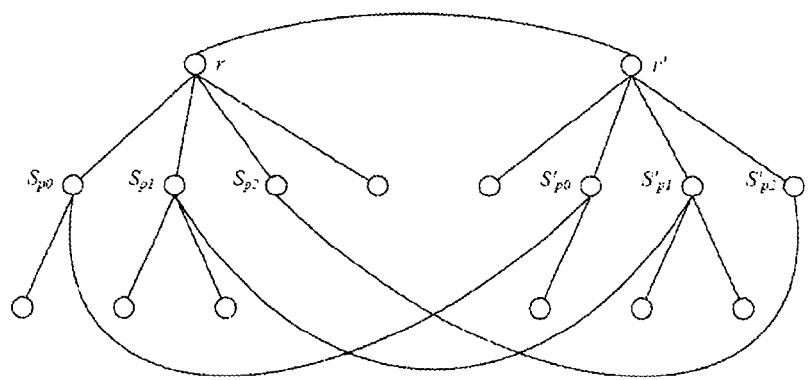
FIG. 5 illustrates a mapping of subtrees.

2) r is mapped to r'. Assume that there are m pairs of subtrees mapped as shown in FIG. 5, then $$Diff(T,T')=n(T)+n(T')-2-\Sigma_{0 \leq i<m} n(S_{pi})+n(S'_{pi'})-Diff(S_{pi},S'_{pi'})$$

Figure 6:
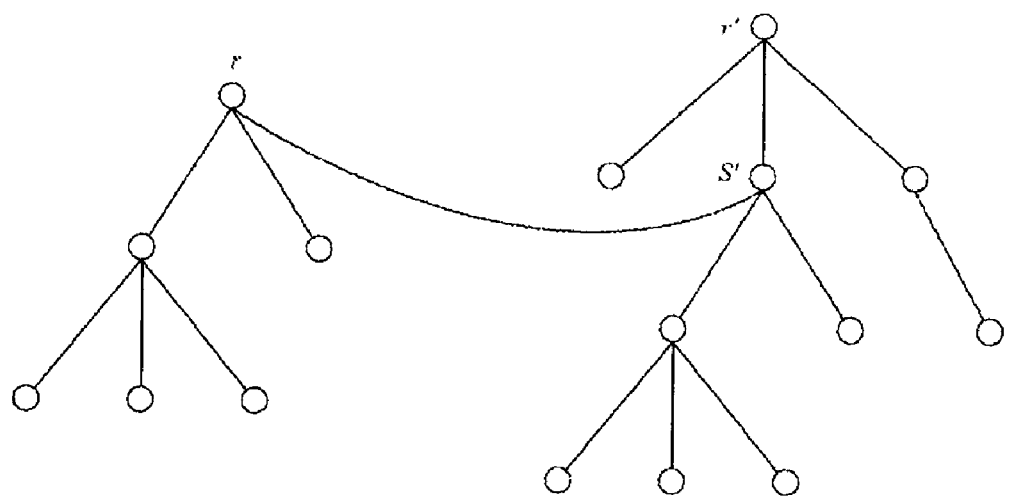
FIG. 6 illustrates a mapping of a tree to a subtree.

3) r is mapped to a node in a subtree S' of T'. Tree T is mapped to S' as shown in FIG. 6, then $$Diff(T,T')=n(T')-n(S')+Diff(T,S')$$

Similarly, if r' is mapped to a node in subtree S of T, then $$Diff(T,T')=n(T)-n(S)+Diff(T',S)$$

The difference Diff(T,T') is recursively defined. In the second condition, we assume that pi and pi' are monotonously increasing, so that the equations may be used to calculate the minimum difference. After calculating the mapping, when given the tracked for a given subtree S in the tree T, we can give a corresponding subtree S', which global position in T' is similar to S's position in T.

The subtree mapping method may give a baseline answer to the tracking of web blocks. However, the subtree mapping method may not consider more related factors which correspond to a user's information needs. Therefore, in another embodiment a learning method may also be utilized. In addition, the subtree mapping method may also be utilized as one factor to be considered in the learning method. The subtree mapping method may obtain better performance when tracing a higher lever subtree. In other words, it may track a subtree A more accurately than a subtree B, where B is a subtree of A.

In another aspect of the invention, a learning method may be utilized to track web block information. Those skilled in the art will realize that different users may use and consider different factors to judge the association of two web blocks in different DOM tree structures. In an embodiment of the invention, user feedback is monitored to learn or discover user preferences or needs. For example, a web page 300 may include different headline stories such as block 302 shown in column 1 (303) entitled "Yao Ming reads with children at home school." Web block 302 may be outlined to be tracked. Web block 302 may evolve as shown in column 2 (304) and illustrated as web block 305 of FIG. 3.

As stated above, different users may consider different factors to compare web blocks. For example, users may consider the content of a web block and determine that web block 305 corresponds to web block 302 of column 1 (303). In the alternative, a different user may determine that web block 306 of column 2 (304) is most related to web block 302 of column 1 (303), as the user believes that the most up-to-date news is displayed in the top upper most position of a web page display. Despite their different consideration, the final web blocks may have some relationship with the original web blocks on various features although their focus may be on different features. Through mining of feedback, a machine learning method may be used to select the important features and identify the final web block.

In an aspect of the invention, online learning may be utilized to collect features which users find important. The system may be designed to assume that all of the web blocks are correct. In the learning method, let T stand for the DOM tree of the original web page, and S represent one of its subtrees and stands for the tracked block. $T_1, T_2, \ldots T_n$ may stand for the different versions of web pages. According to an embodiment of the invention, users may get all the tracked blocks $S_1, S_2, \ldots S_{n-1}$ in their versions of page ($S_i \in Subtree(T_i)$) In order to determine which subtree $S_n \in Subtree(T_n)$ is the corresponding block in the $n^{th}$ version of the web page, we may accept $S_1, S_2, \ldots S_{n-1}$ as positive samples, and all other subtrees of $T_1, T_2, \ldots T_{n-1}$ as negative samples. A learning method may then be applied to train the classifier and classify the subtrees of $T_n$. Only one positive sample may be needed in the results. If more positive samples are determined by the classifier, then the one with the highest probability may be utilized.

In another aspect of the invention, selected features may be divided into two classes, the tree structure of the block in the DOM tree and content presented in the web block. The structure features may include information of subtree S in the tree T. The structure features may include at least those as show in Table 1.

TABLE 1

| Structure Features | Description |
| --- | --- |
| Root Level | Level of the root node $r$ of $S$ is in the $T$. |
| RankInSiblings | Rank in the children list of parent node. |
| OffspingNumbers | Number of nodes in $S$. |

The following content features are used to represent the content of a web block. The content features may include at least those as show in Table 2.

TABLE 2

| Content Features | Description |
| --- | --- |
| Text Length | Number of words in the web block. |
| Key words | Frequency of words in the web block. |
| Title | Title of the web block. |
| LinkNum | Number of hyper links. Feature may distinguish an index block from a text block. |
| ImageInfo | Information of images in web block |

Those skilled in the art will realize that other structures and content features may also be utilized for tracking web blocks as table 1 and table 2 contain exemplary features and do not contain an exhaustive list of features.

Figure 4:
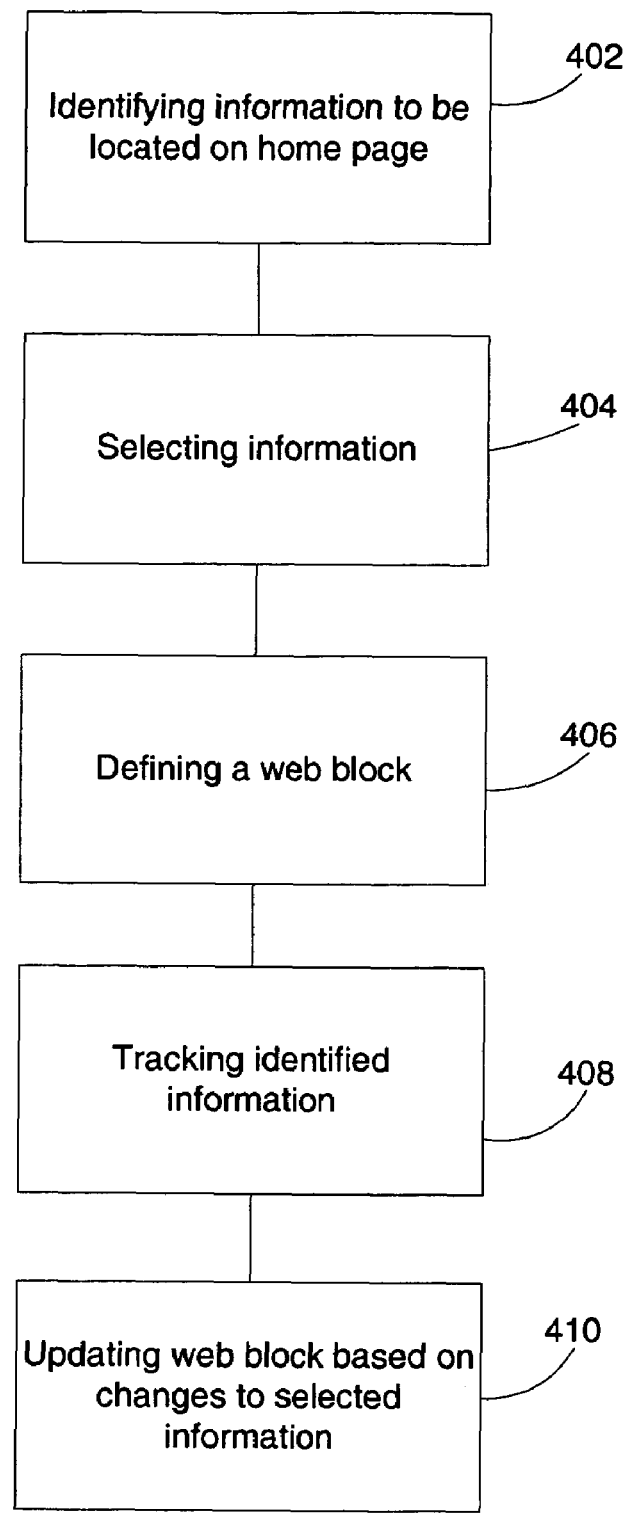
FIG. 4 illustrates a method of creating a dynamic home page in accordance with an aspect of the invention.

FIG. 4 shows an illustrative method for creating a dynamic personal home page. Referring to FIG. 4 at step 402, a user identifies information to be located on the personal home page. The identified information may be located on a web page or web pages of interest to the user. For example as discussed above, a user interested in political news may be interested in viewing political news as reported by CNN on their dynamic personal web page. The user may decide to place this political news information on their dynamic personal home page for viewing on a regular basis without having to directly access CNN's web page. The user may in step 404 select the information. Next, in step 406 a web block may be defined based on the selected information. The selected information may be displayed on the user's home page in a particular display pane. Furthermore, in step 408 the identified information may be tracked in order to keep the selected information updated. Finally, in step 410 the selected information may be updated based on changes to the selected information on the original web page.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method performed by a computer of creating a home page, the method comprising the steps of:
for each of a plurality of web pages,
receiving from a user a selection of the web page, the selected web page having an original tree of nodes;
displaying to the user the selected web page;
receiving from the user a selection of information of the displayed web page, the selected information to be located on the home page;
defining a web block of the displayed web page based on the selected information of the displayed web page, the web block representing an original subtree of the original tree structure of the displayed web page; and
adding the defined web block to the home page;
when displaying the home page, displaying the defined web block on the home page for each of the plurality of selected web pages; and
for each of the selected web pages,
tracking by the computer the selected information of the selected web page, the tracking including:
identifying a mapping of nodes of the original tree of the selected web page to nodes of a new tree of the selected web page that minimizes differences between the original subtree of the original tree and a corresponding subtree of the new tree, the original tree and the original subtree and the new tree and the corresponding subtree are based on the document object model (DOM); and collecting user feedback relating to structural features and content features of the original subtree and the corresponding subtree, the structural features including at least one feature selected from a group consisting of root level, RankInSibling, and Offspringnumbers, the content features including at least one feature selected from the group consisting of Text Length, Key words, Title, LineNum, and ImageInfo;

learning via a learning algorithm from the collected user feedback features that indicate which information of the new tree correspond to the selected information of the original tree; and identifying information of the selected web page that corresponds to the previously selected information of the selected web page based on the learning and the mapping; and updating the web blocks added to the home page based on the tracking of the selected information of the selected web page.

2. The method of claim 1, wherein the step of defining a web block further comprises the step of partitioning the web page.

3. The method of claim 1, wherein the web page comprises hypertext mark-up language.

4. The method of claim 1, wherein the step of tracking the identified information further comprises determining the minimum difference between a first DOM tree and a second DOM tree.

5. The method of claim 4, wherein the first DOM tree is associated with the created home page and the second DOM tree is associated with the selected information.

6. A computer-readable storage medium having computer-executable instructions for performing steps comprising:

identifying information to be located on the home page, the information located on a web page, the identifying of the information including receiving from a user a selection of the web page, displaying to the user the selected web page, and receiving from the user an indication of information of the displayed web page that is to be located on the home page;

selecting the indicated information;

defining a web block of the selected web page based on the selected information, the web block representing an original subtree of an original tree of nodes of the displayed web page;

displaying the defined web block on the home page;

tracking the identified information of the selected web page, the tracking including:

identifying a mapping of nodes of the original tree of the selected web page to nodes of a new tree of the selected web page that minimizes differences between the original subtree of the original tree and a corresponding subtree of the new tree, the original tree and the original subtree and the new tree and the corresponding subtree are based on the document object model (DOM); and collecting user feedback relating to structural features and content features of the original subtree and the corresponding subtree, the structural features including at least one feature selected from a group consisting of root level, RankInSibling, and Offspringnumbers, the content features including at least one feature selected from the group consisting of Text Length, Key words, Title, LineNum, and ImageInfo;

learning via a learning algorithm from the collected user feedback features that indicate which information of the new tree correspond to the selected information of the original tree; and identifying information of the selected web page that corresponds to the previously selected information of the selected web page based on the learning and the mapping; and updating the web block displayed on the home page based on changes to the selected information.

7. The computer-readable storage medium of claim 6, wherein the step of defining a web block further comprises the step of partitioning the web page.

8. A computer for creating a home page derived from a plurality of web pages, comprising:

a memory storing computer-executable instructions that:

for each of the plurality of web pages, receive from a user a selection of the web page, the selected web page having an original tree of nodes;

display to the user the selected web page;

receive from the user a selection of information of the displayed web page, the selected information to be located on the home page;

define a web block of the displayed web page based on the selected information of the displayed web page, the web block representing an original subtree of the original tree structure of the displayed web page; and add the defined web block to the home page;

when displaying the home page, display the defined web block on the home page for each of the plurality of selected web pages; and for each of the selected web pages, track the selected information of the selected web page, the tracking including:

identify a mapping of nodes of the original tree of the selected web page to nodes of a new tree of the selected web page that minimizes differences between the original subtree of the original tree and a corresponding subtree of the new tree, the original tree and the original subtree and the new tree and the corresponding subtree are based on the document object model (DOM); and collect user feedback relating to structural features and content features of the original subtree and the corresponding subtree, the structural features including at least one feature selected from a croup consisting of root level, RankInSibling, and Offspringnumbers, the content features including at least one feature selected from the group consisting of Text Length, Key words, Title, LineNum, and ImageInfo;

learn via a learning algorithm from the collected user feedback features that indicate which information of the new tree correspond to the selected information of the original tree; and identify information of the selected web page that corresponds to the previously selected information of the selected web page based on the learning and the mapping; and update the web blocks added to the home page based on the tracking of the selected information of the selected web page;

a processor for executing the computer-executable instructions stored in the memory.

* * * * *

UNITED STATES PATENT AND TRADEMARK OFFICE
CERTIFICATE OF CORRECTION

PATENT NO. : 7,594,013 B2 Page 1 of 1
APPLICATION NO. : 11/136029
DATED : September 22, 2009
INVENTOR(S) : Wang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 793 days.

Signed and Sealed this

Twenty-eighth Day of September, 2010

David J. Kappos
*Director of the United States Patent and Trademark Office*